Patented Oct. 14, 1924.

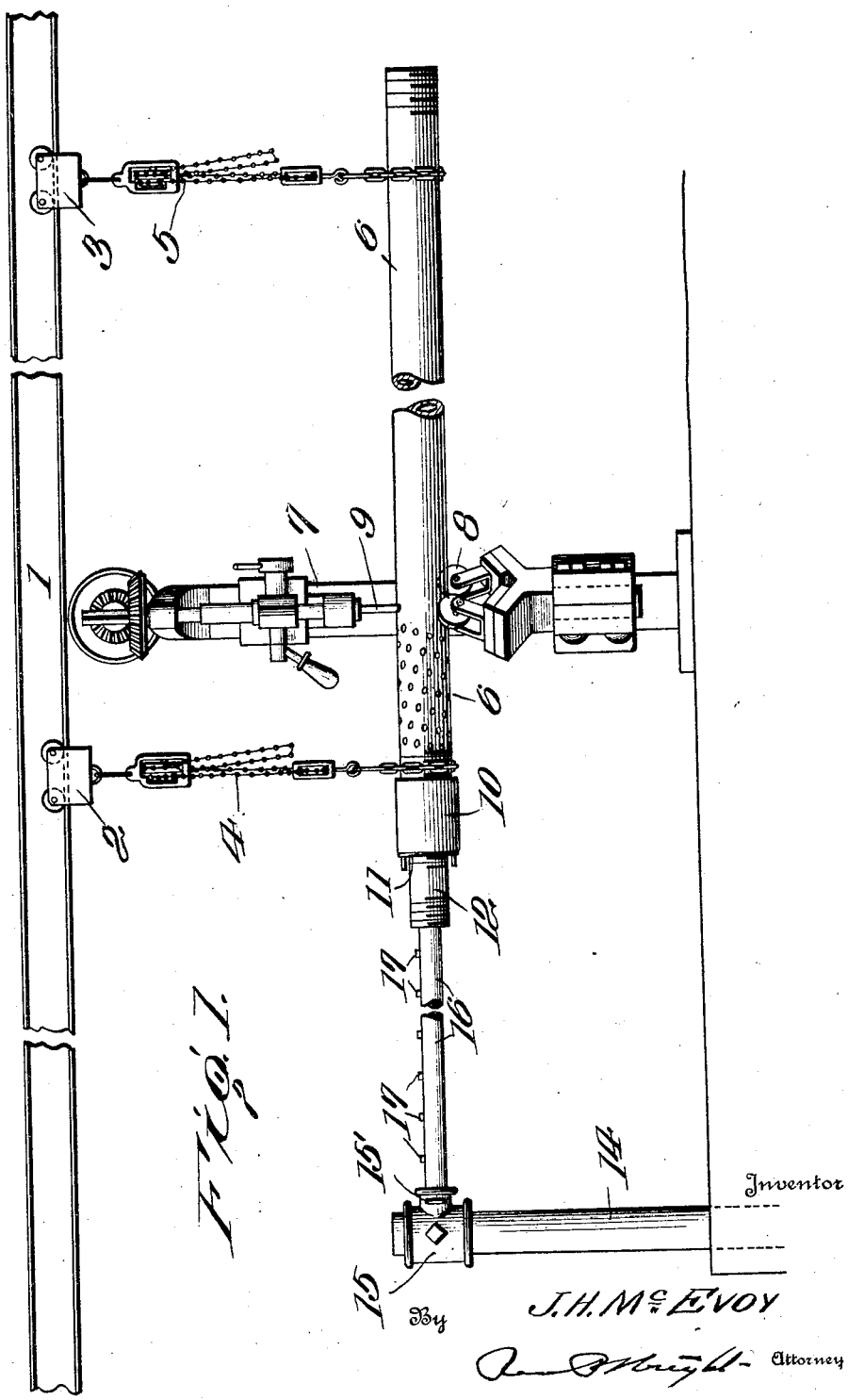
Oct. 14, 1924.
J. H. McEVOY
1,511,415
WORK FEEDING MECHANISM FOR DRILL PRESSES OR THE LIKE
Filed Feb. 12, 1923
2 Sheets-Sheet 1

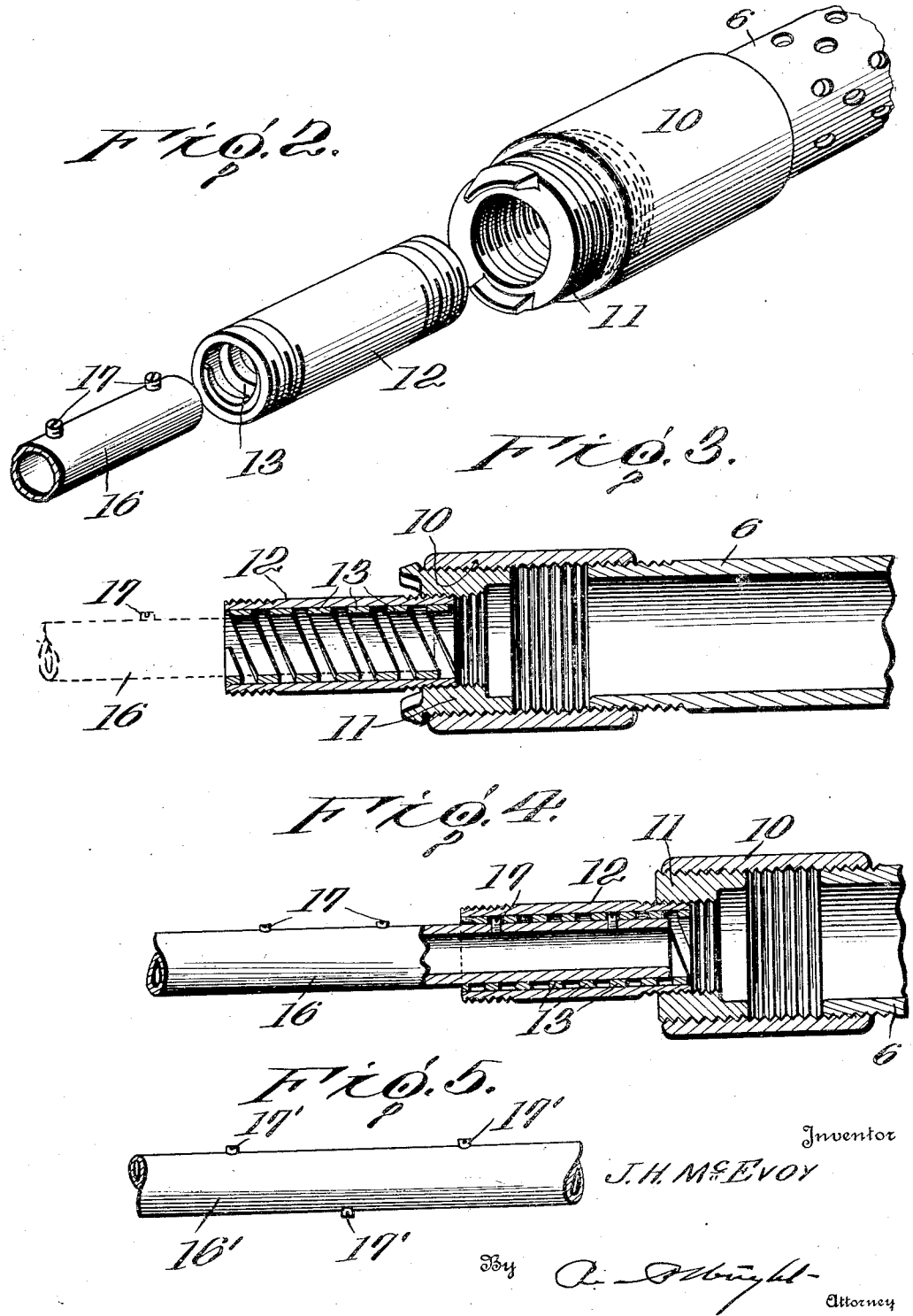

1,511,415

UNITED STATES PATENT OFFICE.

JOSEPH H. McEVOY, OF HOUSTON, TEXAS.

WORK-FEEDING MECHANISM FOR DRILL PRESSES OR THE LIKE.

Application filed February 12, 1923. Serial No. 618,642.

*To all whom it may concern:*

Be it known that I, JOSEPH H. MCEVOY, a citizen of the United States, residing at Houston, in the county of Harris and State of Texas, have invented certain new and useful Improvements in Work-Feeding Mechanism for Drill Presses or the like, of which the following is a specification, reference being had therein to the accompanying drawing.

This invention relates to certain new and useful improvements in work feeding mechanism for drill presses or the like, the object being to provide novel means for supporting and moving a pipe section or other object upon which it is desired to perform work of this character over the bed of a drill press to allow the pipe section or object to be operated on to form a plurality of openings spaced equal distances apart and is especially adapted to be used for perforating the pipe sections for forming well strainers.

Prior to my invention in perforating pipes in forming well strainers, the perforations were formed more or less irregularly in the pipe as no exact means had been provided for feeding the pipe in respect to the drill of the press, which caused the perforations to be so placed that they more or less weakened the pipe section and it was very difficult to form as great a number of openings in the pipe section as is capable with my apparatus and as the advantage of a well strainer is to provide a strainer section with as many openings as possible evenly spaced apart without weakening the pipe, I have provided means for accomplishing this result in a novel manner.

Another object of my invention is to provide a feed mechanism which is exceedingly simple and cheap in construction in which the feed screw or nuts are so formed that they are interchangeable so as to cause the pipe to move longitudinally in respect to the drill different distances per revolution or rotation of pipe in order to space the openings as desired.

A still further object of the invention is to provide a novel form of key member in which the feed nut travels for causing the pipe section to move longitudinally in respect to the drill press whereby the cost of manufacturing the same is greatly reduced and I am able to have the pipe travel longitudinally in respect to the press a predetermined distance on each revolution or part thereof so as to position the openings formed by the drill of the press equal distances apart.

While I have shown and described an apparatus especially adapted to be used for perforating pipe sections for forming strainers, it is, of course, understood that my invention is capable of perforating pipes and cylinders of all kinds or forming perforations in various other objects and therefore I do not wish to limit myself to the particular use of this invention.

Other and further objects and advantages of the invention will be hereinafter set forth and the novel features thereof defined by the appended claims.

In the drawings,

Figure 1 is a front elevation of an apparatus constructed in accordance with my invention;

Figure 2 is a perspective view of a portion of a strainer pipe section, coupling, bushing, feed screw and key member showing the relative position of the parts in position to be assembled;

Figure 3 is a longitudinal section through the same, the key member being shown in dotted lines;

Figure 4 is a longitudinal section showing the key member within the feed screw; and Figure 5 is a detail view of a modified form of key member.

In the drawing 1 indicates an overhead track as now generally in use on which are mounted carriages 2 and 3 provided with chain blocks 4 and 5 of the ordinary construction now in use for supporting the work to be operated on, which is herein shown as a pipe section 6 in position on a supporting bed of a drill press 7 which is herein shown provided with rollers 8 for supporting the pipe under the drill 9.

The pipe section 6 is preferably provided with threaded ends and screwed on one of the threaded ends is a coupling member 10 in which is secured an externally and internally threaded reducing bushing member 11 in which is adapted to be screwed or otherwise fastened one of the threaded ends of a feed nut 12 herein shown formed of a tubular member having externally threaded ends and in which is secured a spiral 13. The spiral is secured within the tubular retainer for the spiral, the two parts being secured together by suitable means forming the feed nut and I preferably secure the spiral in position by welding or by making the feed nut of one solid piece with internal threads, it, of course, being understood that the particular manner of connecting the feed nut and pipe to be perforated can be changed as the connection between these two members can be made in any desired manner as well as by threading.

While I have shown the spiral and the tubular member formed separate, it is, of course, understood that they could be formed integral but I have found that the cost of manufacturing the same is greatly reduced by forming them separately and securing the same together after being formed.

Secured in any convenient manner, preferably in a socket formed in the floor and spaced from the drill press is a standard 14 on which is adjustably mounted a T coupling 15 in which is loosely secured by pin 15 one end of a key pipe 16 which is provided with spaced projections 17 herein shown in the form of screws secured within the pipe section, said key pipe being adapted to receive the feed nut and on which the feed nut travels so as to cause the pipe section 6 to move longitudinally in respect to the bit of the drill when the pipe is rotated and by having feed screws with spirals of different pitches, the pipe section can be caused to travel different distances as it is rotated. This enables me to use feed nuts with various pitches, each operating on a single key pipe, the nuts being so formed that they travel a unit distance between each stud in a predetermined number of turns of the pipe and feed nut.

In Figure 5 I have shown the projection 17' with a key member 16' arranged on the upper and lower surfaces of the key member so as to cause the pipe section 6 to move longitudinally a predetermined distance upon each revolution of the same.

In the drawings I have shown an ordinary form of drill press and chain block, overhead track and carriages for supporting the pipe sections to be formed into strainers and as this pipe section is generally formed from 10 to 20 feet in length, I have found that by supporting the same upon chain blocks of the ordinary construction now in use it can be yieldably supported so as to allow the pipe section to be properly positioned on the bed of the drill press in order to allow the drill to form an opening in the pipe section. While I have not shown these members in detail, it is, of course, understood that they are all of the well known forms of drill presses, blocks, tracks and carriages now in use and therefore I do not wish to limit myself to the use of any particular construction of means of this character for supporting a pipe section to be perforated or tapped, as I am aware that various changes in the supporting means can be made without departing from the spirit of my invention.

In the operation of the feeding mechanism as herein shown and used in connection with drill presses and supporting means as illustrated, the pipe which is to be operated on is placed within the chain blocks and allowed to rest on the rollers of the bed of the press. The reducing bushing is then placed in position within the coupling member which has previously been screwed into position upon one end of the pipe section. A feed nut having the desired pitch is then screwed into position within the reducing bushing and the key pipe is inserted within the feed screw and fastened to a rigid standard at the other end. A hole is then formed in the pipe section by the drill of the drill press and the operator then rotates the pipe section which causes the pipe section during rotation around its longitudinal axis to move longitudinally in respect to the drill.

As the pitch of the feed nut determines the distance of movement longitudinally, the operator soon becomes accurate in positioning the openings formed in the pipe section so that the openings are spaced an equal distance apart along the longitudinal axis of the pipe and equal or very nearly equal distances apart around the pipe according to the care taken by the operator.

By using a key member and a feed nut I am able to cause the pipe section to be advanced in respect to the drill of the press and while I am aware that the substitution of feed screws or long threaded screws of different pitches together with threaded nuts to travel thereon would accomplish the same result, the cost of manufacturing long screws would be great in comparison with the cost of manufacturing key pipes and members as herein shown and it would be necessary to have a number of long threaded screws of different pitches where with my construction, it is only necessary to have a number of short feed nuts for advancing the pipe a predetermined distance upon each revolution or part revolution of the pipe.

What I claim is:—

1. The combination with a drill press, of flexible means for supporting and positioning a pipe section in position to be operated on by said press and means for causing said pipe section to move longitudinally in respect to said press as said pipe section is rotated.

2. The combination with a drill press, of means for supporting a pipe section in position to be operated on by said press, a feed nut carried by said pipe section and a key member having projections on which said feed nut travels for moving said pipe section longitudinally in respect to said drill press as said pipe section is rotated.

3. The combination with means for forming openings in a tubular member, of means for supporting a tubular member in position to be operated on by said opening forming means, a feed nut carried by said tubular member and a key member having projections on which said feed nut travels.

4. The combination with a drill press, of flexible means for movably supporting and positioning a pipe section in respect to the bed of the drill press, and means for moving said pipe section longitudinally in respect to said press as said pipe section is rotated.

5. The combination with a drill press, of means for supporting a pipe section on the bed of said press, a bushing carried by said pipe section, a feed nut secured within said bushing and a key member having projections on which said feed nut travels for causing said pipe section to move longitudinally in respect to said drill as said pipe section is rotated.

6. A work feeding mechanism for drill presses comprising a key member having projections, a feed nut traveling on said key member and means for connecting said feed nut to the material being operated on for advancing the said material in respect to said drill press as said material is rotated on the bed of said press.

7. A work feeding mechanism for drill punch or reamer presses comprising a key member having a support at one end and provided with projections, a feed nut having an internal spiral working on said key member, said feed nut being provided with threaded ends and a nut to which said feed screw is connected having a connection with the material to be operated on.

8. The combination with a drilling machine, of flexible means for supporting a pipe section slidably relative to said machine, a key member, a nut member cooperating therewith, one of said members being secured to said pipe section, means to hold the other of said members stationary whereby the rotation of said pipe section will cause it to move longitudinally in respect to said machine.

In testimony whereof I hereunto affix my signature.

JOSEPH H. McEVOY.